April 22, 1924.

J. A. HUETTER 1,491,481

STARTER GEAR BAND

Filed March 6, 1922

INVENTOR
JOHN A. HUETTER
BY
ATTORNEY

Patented Apr. 22, 1924.

1,491,481

UNITED STATES PATENT OFFICE.

JOHN A. HUETTER, OF INDIANAPOLIS, INDIANA.

STARTER GEAR BAND.

Application filed March 6, 1922. Serial No. 541,378.

*To all whom it may concern:*

Be it known that I, JOHN A. HUETTER, a citizen of the United States, residing at Indianapolis, in the county of Marion and State of Indiana, have invented certain new and useful Improvements in Starter Gear Bands, of which the following is a specification.

This invention relates to gear bands designed primarily for use in connection with a pinion of an engine starter and is applied to the periphery of the fly wheel of the engine, and the prime feature of the invention is in so constructing the ends of the gear teeth that said gear may be rendered universal, or may be so constructed as to be rendered interchangeable, and when rendered universal the same gear may be used in connection with pinions that move into engagement therewith from opposite faces of the fly wheel; and when constructed to render the same interchangeable, the band may be reversed on the fly wheel when one end of the teeth becomes so worn as to render them practically useless.

A further feature of the invention is in so constructing the angle or curved faces at the ends of the teeth that they will exactly correspond with the curvature or angle of the ends of the teeth on the starter pinion, thereby maintaining a broad contact face between the teeth of the gear band and pinion, and consequently reducing the wear to a minimum and insuring a more positive engagement between the gear and pinion when the pinion is moved into mesh with the gear.

Other objects and advantages will be hereinafter more fully set forth and pointed out in the accompanying specification.

Figure 1:
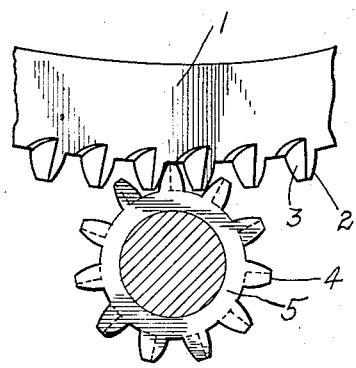
Figure 2:
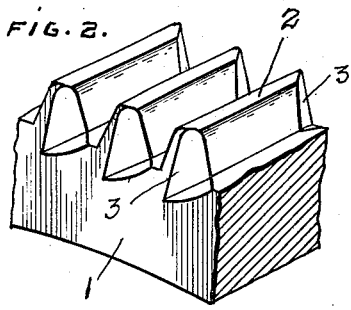
Figure 3:
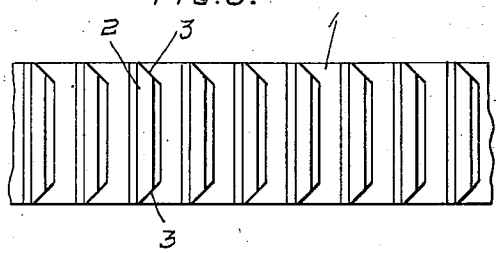
Figure 4:
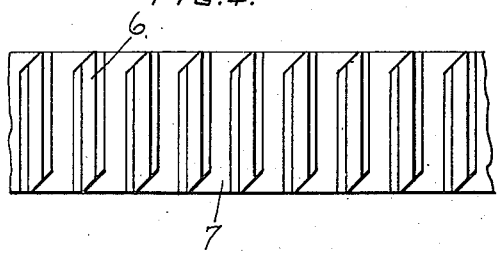

In the accompanying drawings,

Figure 1 is an elevation of a portion of a gear band showing a starter pinion in engagement therewith, Figure 2 is a fragmentary perspective view of the gear band, Figure 3 is a plan view of that form of gear shown in Figures 1 and 2, and Figure 4 is a similar view showing the manner of constructing an interchangeable gear.

In applying gear bands of this nature to use, it is customary to secure a band, preferably of steel, to the periphery of the usual form of fly wheel connected with a motor and when the gear is of the universal type the band is preferably fixed to the fly wheel, and when the gear is of an interchangeable type it may be removably secured to the fly wheel in any suitable manner.

In rendering the band 1 universal, the ends of the teeth 2 are tapered alike at both ends, the tapered faces 3 being substantially at the same angle or curvature as the angle or curvature of the teeth 4 of the starter pinion 5, and as both ends of the teeth in this instance are similarly tapered, the same band may be employed with pinions which move from either direction when being moved into engagement with the gear band.

Heretofore it has been the custom to provide a band for each different construction of pinion and consequently the teeth of the gear were beveled or rounded at one end only, consequently it necessitated the carrying of an immense stock of gears, owing to the different construction or movement of the pinions on the different makes of starters. With this form or device, however, the amount of stock to be carried will be very greatly reduced as the dealer will be required to carry substantially seventy-five per cent less stock, as the universal gears will receive the pinions of the starter moving from either side of the fly wheel, the mounting of the starter pinion at opposite sides of the fly wheel being rendered necessary on different makes of automobiles. In rendering the gear band interchangeable, that is, in instances where the band is to be used in connection with a pinion moving from one direction only, the ends of the teeth 6 are tapered in opposition to each other so that when the ends of the teeth at one side of the band become worn, or otherwise damaged, the band 7 may be removed from the fly wheel and the opposite edge thereof brought into play with the pinion co-operating therewith, thereby increasing or practically doubling the life of the gear band or making two bands in one.

In applying this form of band to use it may be set into a groove at the corner edges of the fly wheel or may be secured around the peripheral face of the fly wheel, and when a universal band is employed the starter pinion may move towards the gear from either face of the fly wheel.

Having thus fully described my said in- vention, what I claim as new and desire to secure by Letters Patent, is:

The combination with the pinion of an engine starter having teeth provided with inclined faces at one end of a reversible gear band of approximately equal hardness for application to a flywheel the teeth of said gear band being formed at both ends to fit exactly against the inclined faces on the starter pinion when the band is applied with either end of the teeth outermost, substantially as set forth.

In witness whereof, I have hereunto set my hand and seal at Indianapolis, Indiana, this 3rd day of March, A. D. nineteen hundred and twenty-two.

JOHN A. HUETTER. [L. s.]

Witnesses:
CAREY S. FRYE,
M. L. SHULER.